United States Patent [19]

Bridgewater et al.

[11] Patent Number: 5,475,688
[45] Date of Patent: Dec. 12, 1995

[54] MEDIA ERROR CODE GENERATION AS FOR A VIDEO INVERSE TRANSPORT PROCESSOR

[75] Inventors: Kevin E. Bridgewater, Indianapolis; Michael S. Deiss, Zionsville; Gregory G. Tamer, Indianapolis, all of Ind.

[73] Assignee: Thomson Consumer Electronics, Inc., Indianapolis, Ind.

[21] Appl. No.: 232,932

[22] Filed: Apr. 22, 1994

[51] Int. Cl.$^6$ .................................................. H04J 3/26
[52] U.S. Cl. ........................................................ 370/94.1
[58] Field of Search ........................... 370/94.1; 348/423, 348/466; 371/57.2, 65

[56] References Cited

U.S. PATENT DOCUMENTS

| | | | |
|---|---|---|---|
| Re. 34,824 | 1/1995 | Morrison et al. | 348/423 |
| 4,636,858 | 1/1987 | Hague et al. | 370/85.1 |
| 4,649,533 | 3/1987 | Chorley et al. | 370/58.3 |
| 4,807,033 | 2/1989 | Keesen et al. | 348/466 |
| 5,168,356 | 12/1992 | Acampora et al. | 358/133 |
| 5,233,654 | 8/1993 | Harvey et al. | 380/20 |
| 5,247,363 | 9/1993 | Sun et al. | 348/616 |
| 5,289,276 | 2/1994 | Siracusa et al. | 348/467 |
| 5,365,272 | 11/1994 | Siracusa | 348/426 |
| 5,371,547 | 12/1994 | Siracusa et al. | 348/426 |
| 5,376,969 | 12/1994 | Zdepski | 348/466 |
| 5,381,181 | 1/1995 | Deiss | 348/423 |
| 5,387,940 | 2/1995 | Kwok et al. | 348/394 |

*Primary Examiner*—Douglas W. Olms
*Assistant Examiner*—Min Jung
*Attorney, Agent, or Firm*—Joseph S. Tripoli; Eric P. Herrmann; Ronald H. Kurdyla

[57] ABSTRACT

In an inverse transport processor of the type which directs video payloads of a packet signal to buffer memory space, apparatus is included for writing a media error codes at sequential first memory address locations in the memory ahead of each packet payload. Concurrently a processor examines the current packet to determine if it occurs in proper sequence. If a packet is lost, the payload is written to memory in subsequent sequential address locations. If there is no packet loss, the sequential first memory address locations are simply overwritten by the packet payload to excise the undesired media error code. Media error codes can thus be inserted in the packet payload stream without creating timing obstacles, for a system designer.

11 Claims, 4 Drawing Sheets

MEDIA ERROR CODE GENERATION AS FOR A VIDEO INVERSE TRANSPORT PROCESSOR

This invention relates to a method and apparatus for inserting medial error codes in packets of compressed video signal for alerting a video signal decompressor to reset to a predetermined state.

BACKGROUND OF THE INVENTION

It is known from, for example, U.S. Pat. No. 5,168,356 that it is advantageous to transmit compressed video signal in packets, with respective packets including a measure of error correction. Television receivers designed to decompress transmitted packeted compressed video signal may not receive the entire sequence of transmitted packets. In the absence of a packet in the received signal, it is known from U.S. Pat. No. 5,289,276 to insert a media error code in the signal stream for a lost packet, which media error code will condition the decompression circuitry to reset at a predetermined signal entry point at which the decompressor can reliably continue decompression.

Apparatus for performing the inverse packing process, at least for high definition television (HDTV) signals must operate a extremely high speed to process the relatively high data rates of a HDTV signal. The present inventors, in designing inverse packet processors found it extremely difficult to arrange apparatus to include media error codes after detecting that a particular packet had been lost in transmission. The present invention solves the problem of inserting media error codes in a non-complicated manner, without incurring any timing constraints over those constraints associated with simple inverse packet processing.

SUMMARY OF THE INVENTION

The present invention is apparatus in an inverse transport processor of the type which directs the video payloads of respective packets to buffer memory space, for writing a media error code at sequential first memory address locations ahead of each packet payload while the processor is checking for lost packets. If a packet is lost, the payload is written to memory in subsequent sequential address locations. If there is no loss of packet, the sequential first memory address locations are simply overwritten by the packet payload to excise the undesired media error code.

BRIEF DESCRIPTION OF THE DRAWINGS

The invention will be described with reference to the drawings, wherein.

DETAILED DESCRIPTION

Figure 1:
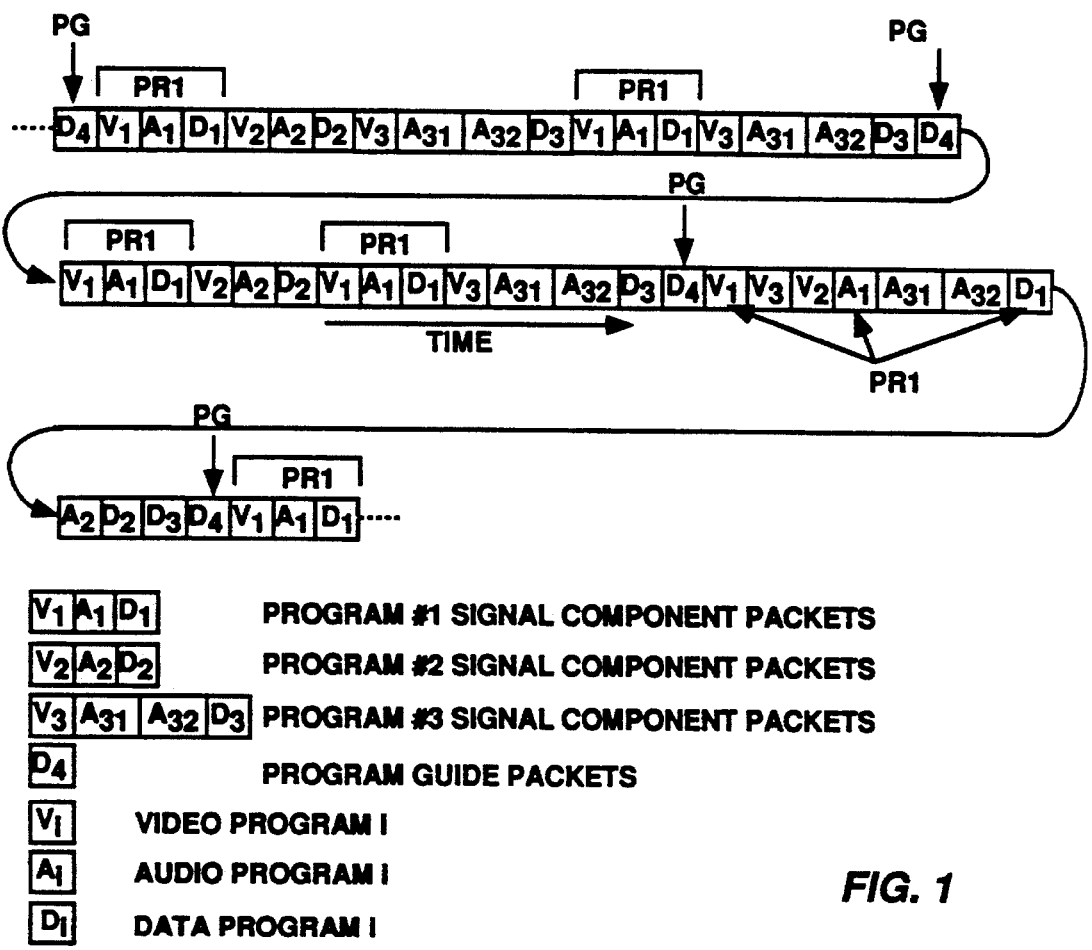
FIG. 1 is a pictorial representation of a time division multiplexed packet television signal.

FIG. 1 shows a signal stream consisting of a string of boxes which represent signal packets which are components of a plurality of different television or interactive television programs. These program components are assumed to be formed of compressed data and as such the quantity of video data for respective images is variable. The packets are of fixed length. Packets with letters having like subscripts represent components of a single program. For example, $V_i$, $A_i$, $D_i$ represent video, audio and data packets and packets designated $V_1$, $A_1$, $D_1$, represent video, audio and data components for program 1, and $V_3$, $A_{31}$, $A_{32}$, $D_3$, represent video, audio 1, audio 2 and data components of program 3. In the upper line of the string of packets the respective components of a particular program are shown grouped together. However there is no necessity of packets from the same program being grouped as is indicated by the packet sequence shown in the middle of portion of the string of packets. Nor is there any particular order for the sequence of occurrence of respective components.

Figure 2:
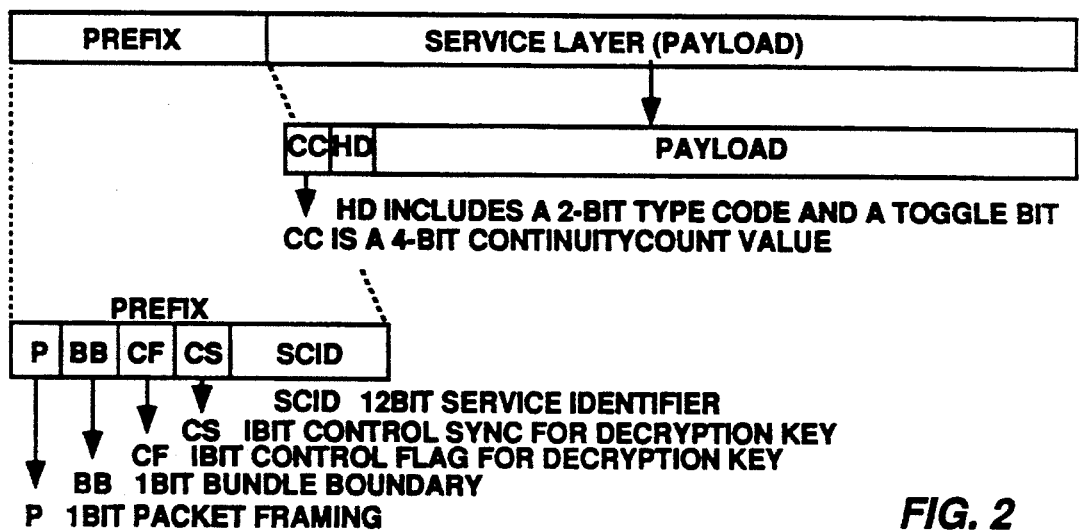
FIG. 2 is a pictorial representation of respective signal packets.

The respective packets are arranged to include a prefix and a payload as shown in FIG. 2. The prefix of this example includes two 8-bit bytes comprising five fields, four (P, BB, CF, CS) of which are 1-bit fields, and one (SCID) of which is a 12-bit field. The SCID field is the signal component identifier. The field CF contains a flag to indicate whether the payload of the packet is scrambled, and the field CS contains a flag which indicates which of two alternative unscrambling keys is to be utilized to unscramble scrambled packets. The prefix of every packet is packet aligned, thus the location of the respective fields are easily identifiable.

Within every payload is a header which contains a continuity count, CC, modulo 16, and a TOGGLE flag bit which are program component specific. The continuity count is simply a successive numbering of sequential packets of the same program component. The TOGGLE flag bit, in video component packets, is a one bit signal which changes logic level or toggles at the occurrence of a picture layer header, that is at the beginning of a new frame.

Figure 3:
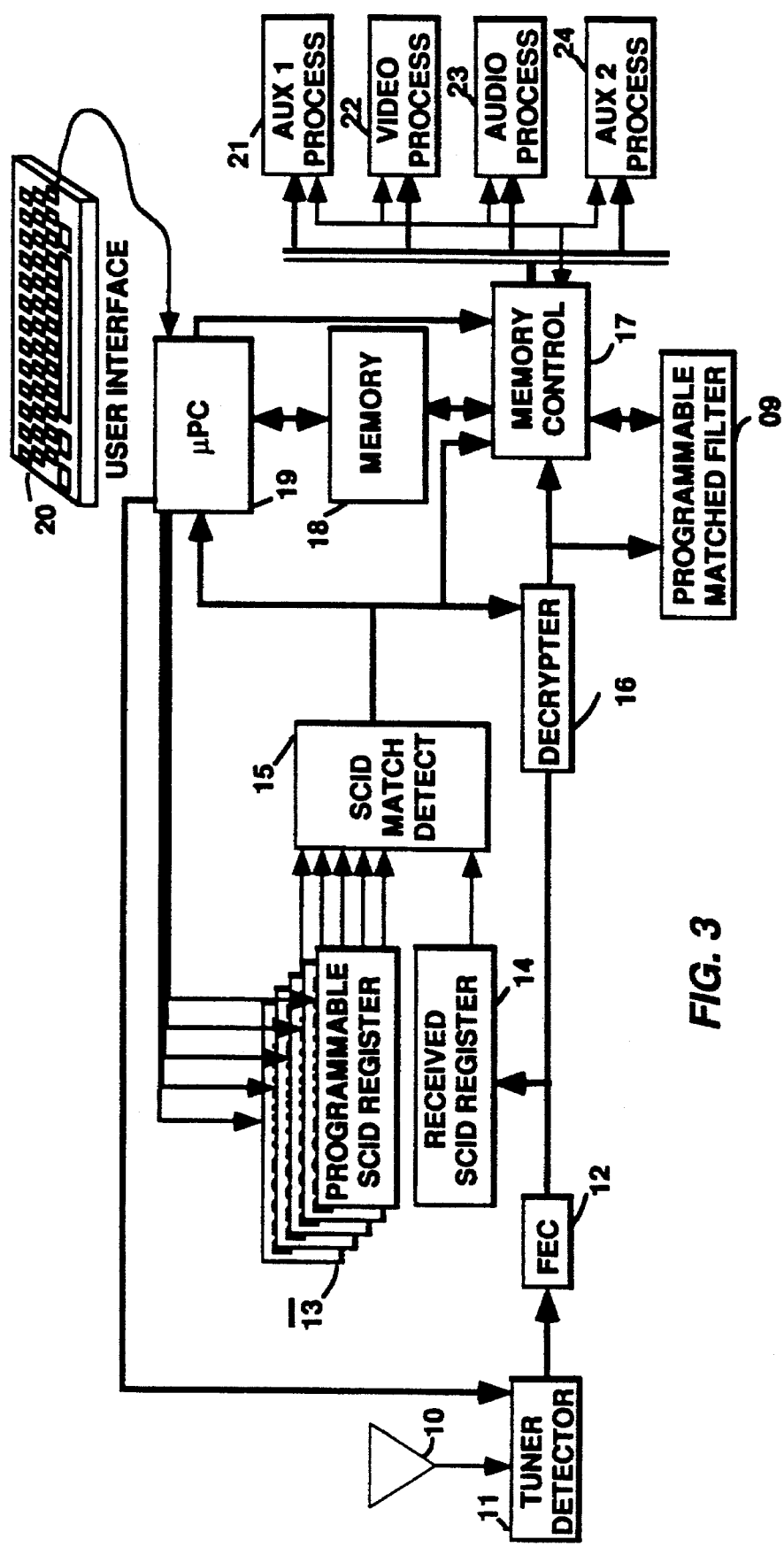
FIG. 3 is a block diagram of a receiver for selecting and processing packets of multiplexed component signals embodying the present invention.

FIG. 3 illustrates in block form a packet detector/selector of a digital television receiver. Signal is detected by an antenna 10 and applied to a tuner detector, 11, which extracts s a particular frequency band of received signals, and provides baseband compressed signal in a binary format. The frequency band is selected by the user through a microprocessor 19 by conventional methods. Nominally broadcast digital signals will have been error encoded using, for example, Reed-Solomon forward error correcting (FEC) coding. The baseband signals will thus be applied to a FEC decoder, 12. The FEC decoder 12 will synchronize the received video and provide a stream of signal packets of the type illustrated in FIG. 1. The FEC 12 may provide packets at regular intervals, or on demand, by for example, memory controller 17. In either case a packet framing or synchronizing signal is provided by the FEC circuit, which indicates the times that respective packet information is transferred from the FEC 12.

The detected frequency band may contain a plurality of time division multiplexed programs in packet form. To be useful, only packets from a single program should be passed to the further circuit elements. In this example it is assumed that the user has no knowledge of which packets to select. This information is contained in a program guide, which in itself is a program consisting solely of data which interrelates program signal components through SCID's. The program guide is a listing for each program, of the SCID's for the audio, video, and data components of respective programs. The program guide (packets D4 in FIG. 1) is assigned a fixed SCID. When power is applied to the receiver, the microprocessor 19 is programmed to load the SCID associated with the program guide into one of a bank of similar programmable SCID registers 13. The SCID field of the prefix portion of respective detected packets of signal from the FEC 12 are successively loaded in a further SCID register 14. The programmable registers and the received SCID register are coupled to respective input ports of a comparator circuit 15, and the received SCID is compared with the program guide SCID. If the SCID for a packet matches the program guide SCID, the comparator 15 conditions a memory controller 17 to route that packet to a predetermined location in the memory 18 for use by the microprocessor. If the received SCID does not match the program guide SCID, the corresponding packet is simply dumped.

The microprocessor waits for a programming command from the user via an interface 20, which is shown as a computer keyboard but which may be a conventional remote control, or receiver front panel switches. The user may request to view a program provided on channel 4 (in the vernacular of analog TV systems). The microprocessor 19 is programmed to scan the program guide list that was loaded in the memory 18 for the respective SCID's of the channel 4 program components, and to load these SCID's in respective other ones of the programmable registers of the bank of registers 13 which are associated with corresponding component signal processing paths.

Received packets of audio, video or data program components, for a desired program, must ultimately be routed to the respective audio 23, video 22, or auxiliary data 21, (24) signal processors respectively. The exemplary system of FIG. 3, first routes the respective packets to predetermined memory locations in the memory 18. Thereafter the respective processors 21–24 request the component packets from the memory 18. It should be appreciated that the signal components are compressed and that decompression devices do not require input data on a continuous basis. Routing the components through the memory provides a measure of desired signal throttling.

The audio, video and data packets are loaded into predetermined memory locations to enable the signal processors easy access to the component data. In order that the appropriate packets get loaded in the appropriate memory areas, the respective SCID comparators must be associated with those memory areas. This association may be hardwired in the memory controller 17, or the association may be programmable. If the former, specific ones of the programmable registers will always be assigned the audio, video and data SCID's respectively. If the latter the audio, video and data SCID's may be loaded in any of the programmable registers, and the appropriate association be programmed in the memory control 17 when the respective SCID's are loaded in the programmable registers.

In the steady state, after the program SCID's have been stored in the programmable registers 13, the SCID's of received signal packets are compared with all of the SCID's in the programmable SCID registers. If a match is made with either a stored audio, video or data SCID, the corresponding packet payload will be stored in the audio, video or data memory area respectively.

The respective signal packets are coupled from the FEC 12 to the memory controller 17 via a signal decryptor 16. Only the signal payloads are scrambled. Whether or not a packet is to be descrambled is determined by the CF flag in the packet prefix, and how it is to be descrambled is determined by the CS flag. If no SCID match is had for a respective packet, the decryptor may simply be disabled from passing any data. Alternatively, if there is no SCID match for a packet the decryptor may be allowed to decrypt according to its last settings and the memory write control may be disabled to dump the respective packet.

Figure 4:
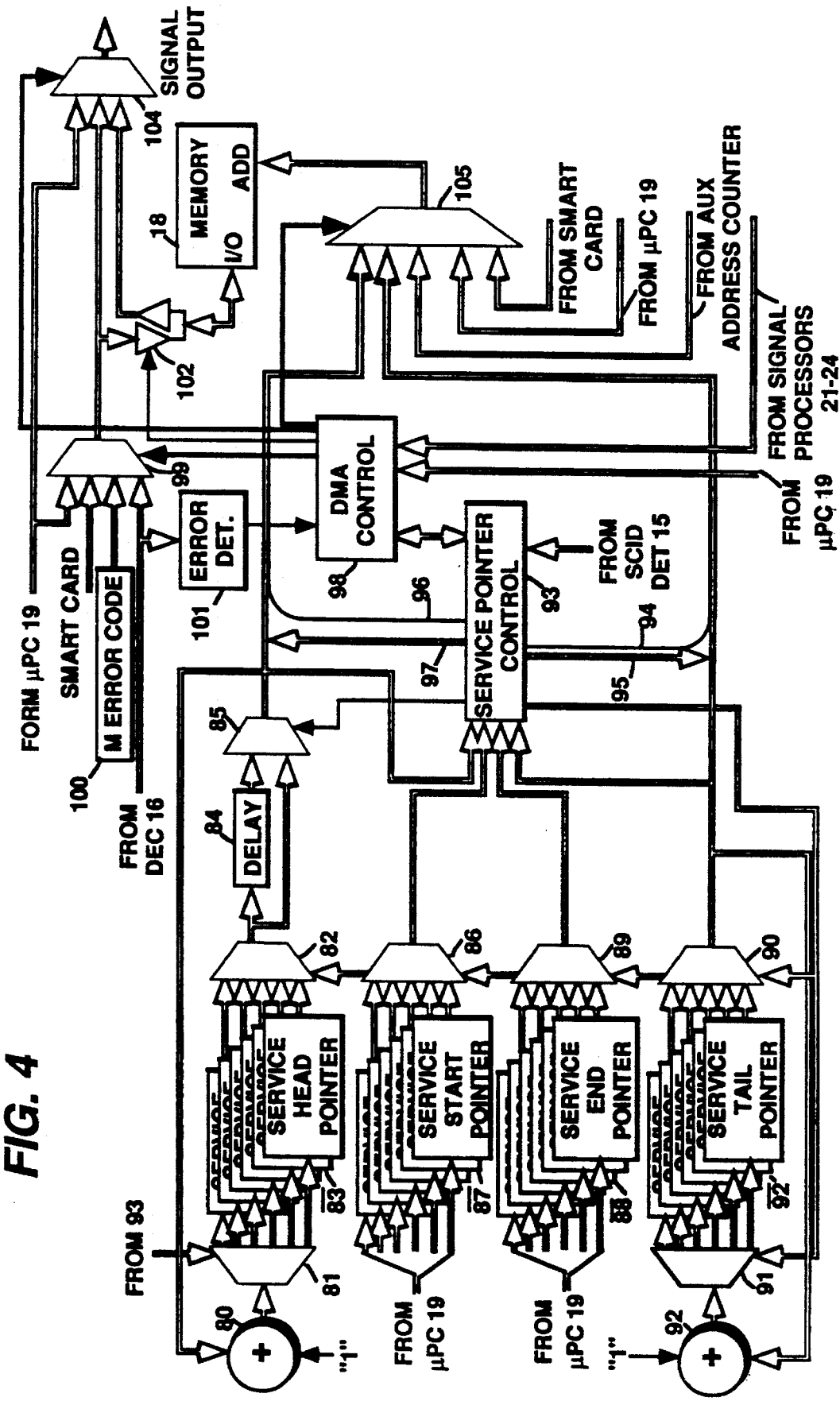
FIG. 4 is a block diagram of exemplar memory management circuitry which may be implemented for element 17 of FIG. 3.

FIG. 4 illustrates exemplary apparatus for the memory controller 17 shown in FIG. 3. Each program component is stored in a different contiguous block of the memory 18. In addition other data, such as data generated by the microprocessor 19 or a Smart Card (not shown) may be stored in the memory 18.

Addresses are applied to the memory 18 by a multiplexor 105, and input data is applied to the memory 18 by a multiplexor 99. Output data from the memory management circuitry is provided to the signal processors by a further multiplexor 104. Output data provided by the multiplexor 104 is derived from the microprocessor 19, the memory 18 or directly from the multiplexor 99. Program data is presumed to be of standard picture resolution and quality, and occurring at a particular data rate. On the other hand high definition television signals, HDTV, which may be provided by this receiver, occur at a significantly higher data rate. Practically all data provided by the FEC will be routed through the memory 18 via the multiplexor 99 and memory I/O circuit 102, except for the higher rate HDTV signals which may be routed directly from the multiplexer 99 to the multiplexor 104. Data is provided to the multiplexer 99 from the decryptor 16, the smart card circuitry, the microprocessor 19, and a source of a media error codes 100. The term "media error codes" as used herein, mean special codewords to be inserted in a data stream, to condition the respective signal processor (decompressor) to suspend processing until detection of a predetermined codeword such as a start code, and then to resume processing in accordance with the e.g. start code.

Memory addresses are provided to the multiplexor 105, from program addressing circuitry 79–97, from the microprocessor 19, from the Smart Card apparatus (not shown) and possibly from other auxiliary devices. Selection of the particular address at any particular time period is controlled by a direct memory access DMA, circuit 98. The SCID control signals and "data needed" signals from respective signal processors are applied to the DMA 98, and responsive thereto, memory access contention is arbitrated. The DMA 98 cooperates with a Service Pointer Controller 93, to provide the appropriate read or write addresses for respective program signal components.

The respective addresses for the various signal component memory blocks are generated by four groups of program component or service pointer registers 83, 87, 88, and 92. The starting pointers for respective blocks of memory, into which respective signal components are stored, are contained in registers 87 for the respective signal components. The start pointers may be fixed values, or they may be calculated by conventional memory management methods in the microprocessor 19.

The last address pointers for respective blocks are stored in the bank of service registers 88, one for each potential program component. Similar to the start addresses, the end addresses may be fixed values or they may be calculated values provided by the microprocessor 19. Using calculated values for starting and end pointers is preferred because it provides a more versatile system with less memory.

The memory write pointers or head pointers are generated by the adder 80 and the service head registers 83. There is a service head register for each potential program component. A write or head pointer value is stored in a register 83, and provided to the address multiplexor 105 during a memory write cycle. The head pointer is also coupled to the adder 80, wherein it is incremented by one unit, and the incremented pointer is stored in the appropriate register 83 for the next write cycle. The registers 83 are selected by the service pointer controller, 93, for the appropriate program component currently being serviced.

In this example it is assumed that the start and end pointers are 16-bit pointers. The registers 83 provides 16 bit write or head pointers. The memory 18, on the other hand has 18-bit addresses. The 18-bit write addresses are formed by concatenating the two most significant bits of the start pointers to the 16-bit head pointers, with the start pointer bits in the most significant bit positions of the combined 18-bit write address. The start pointers are provided by the respective registers 87 to the service pointer controller 93. The service pointer controller parses the more significant start pointer bits from the start pointers stored in registers 87, and associates these bits with the 16-bit head pointer bus. This is illustrated by the bus 96 shown being combined with the head pointer bus exiting the multiplexer 85.

Similarly, memory read pointers or tail pointers are generated by the adder 79 and the service tail registers 92. There is a service tail register for each potential program component. A read or tail pointer value is stored in a register 92, and provided to the address multiplexor 105 during a memory read cycle. The tail pointer is also coupled to the adder 79, wherein it is incremented by one unit, and the incremented pointer is stored in the appropriate register 92 for the next read cycle. The registers 92 are selected by the service pointer controller, 93, for the appropriate program component currently being serviced.

The registers 92 provides 16 bit tail pointers. 18-bit read addresses are formed by concatenating the two most significant bits of the start pointers to the 16-bit tail pointers, with the start pointer bits in the most significant bit positions of the combined 18-bit write address. The service pointer controller parses the more significant start pointer bits from the start pointers stored in registers 87, and associates these bits with the 16-bit tail pointer bus. This is illustrated by the bus 94 shown being combined with the tail pointer bus exiting the multiplexer 90.

Data is stored in the memory 18 at the calculated address. After storing a byte of data, the head pointer is incremented by one and compared to the end pointer for this program component, and if they are equal the more significant bits of the head pointer are replaced with the lower 14 bits of the start pointer and zeros are placed in the lower two bit positions of the head pointer portion of the address. This operation is illustrated by the arrow 97 pointing from the service pointer controller 93 to the head pointer bus from the multiplexer 85. It is presumed that application of the lower 14 start pointer bits override the head pointer bits. Replacing the head pointer bits with the lower start pointer bits in the address for this one write cycle, causes the memory to scroll through the memory block designated by the upper two start pointer bits, thus obviating reprogramming write addresses at the start of each packet to a unique memory location within a block.

If the head pointer ever equals the tail pointer (used to indicate where to read data from the memory 18) a signal is sent to the interrupt section of the microprocessor to indicate that a head tail crash has occurred. Further writing to the memory 18 from this program channel is disabled until the microprocessor reenables the channel. This case is very rare and should not occur in normal operation.

Data is retrieved from the memory 18 at the request of the respective signal processors, at addresses calculated by the adder 79 and registers 92. After reading a byte of stored data, the tail pointer is incremented by one unit and compared to the end pointer for this logical channel in the service pointer controller 93. If the tail and end pointers are equal then the more significant bits of the tall pointer are replaced with the lower 14 bits of the start pointer and zeros are placed in the lower two bit positions of the tail pointer portion of the address. This is illustrated by the arrow 95 emanating from controller 93 and pointing to the tail pointer bus from the multiplexer 90. If the tail pointer is now equal to the head pointer then the respective memory block is defined as empty and no more bytes will be sent to the associated signal processor until more data is received from the FEC for this program channel. The actual replacement of the head or tail pointer portions of the respective write or read addresses by the lower 14 bits of the start pointer may be accomplished by appropriate multiplexing, or the use of three state interconnects.

It will be appreciated by those skilled in the art of digital signal processing that the combination of memory and addressing circuitry utilized above effectively conditions the random access memory 18 to operate as a plurality of first-in-first-out memories or FIFO's.

Memory read/write control is performed by the service pointer controller and direct memory access, DMA, elements 93 and 94. The DMA is programmed to schedule read and write cycles. Scheduling is dependent upon whether the FEC 12 is providing data to be written to memory or not. FEC data write operations take precedence so that no incoming signal component data is lost. In the exemplary apparatus illustrated in FIG. 4, there are four types of apparatus which may access the memory. These are Smart Card (not shown), the FEC 12 (more precisely the decryptor 16), the microprocessor 19 and one of the application devices such as the audio and video processors. Memory contention is handled in the following manner. The DMA, responsive to data requests from the various processing elements listed above, allocates memory access as follows. Access to the memory is provided in 95 nS time slots during which a byte of data is read from or written to the memory 18. There are two major modes of access allocation, defined by "FEC Providing Data", or "FEC Not Providing Data" respectively. For each of these modes the time slots are allocated and prioritized as follows, assuming a maximum FEC data rate of 5 Mbytes/second, or one byte for each 200 nS. These are:

FEC Providing Data
1) FEC data write;
2) Application device read/Microprocessor read/write;
3) FEC data write;
4) Microprocessor read/write; and for FEC Not Providing Data
1) Smart Card read/write;
2) Application device read/Microprocessor read/write;
3) Smart Card read/write;
4) Microprocessor read/write.

Because FEC data writes cannot be deferred, the FEC (or more correctly the decryptor), when providing data must be guaranteed memory access during each 200 nS interval. Alternate time slots are shared by the application devices and the microprocessor. When there is no data available for the requesting devices, the microprocessor is provided use of the application time slots.

The Controller 93 communicates with the SCID detector to determine which of the respective Start, head and end pointer registers to access for memory write operations. The controller 93 communicates with the DMA to determine which of the start, end and tail registers to access for memory read operations. The DMA 98 controls selection of the corresponding addresses and data by the multiplexers 99, 104 and 105.

As stated earlier, it is advantageous to insert media error codes into the video component signal stream when packets are lost, to condition the video signal decompressor to suspend decompression until a particular signal entry point occurs in the data stream. It is not practical to predict where and in which video packet the next entry point may occur. In order to find the next entry point as fast as possible, it is necessary to include a media error code at the beginning of the first video packet after detection that a packet is lost. The circuitry of FIG. 4 places a media error code at the beginning of every video packet and then excises the media error code in respective packets if there is no loss of a preceding packet. The media error code is inserted in the first M memory address locations reserved for the current video packet payload, by writing to memory 18 for M write cycles prior to the video payload arriving from the decryptor. Concurrently the multiplexor 99 is conditioned by the DMA 98, to apply the media error code from the source 100 to the memory 18 I/O. M is simply the integer number of memory locations required to store the media error code. Assuming the memory to store 8-bit bytes, and the media error code to be 32 bits, M will equal 4.

The addresses for loading the media error code in memory are provided by the respective video component service register 83 via the multiplexer 82 and multiplexer 85. It will be appreciated that the first M addresses provided from the pointer register 83 for loading the media error code into the memory locations that would otherwise be loaded with video component data, will simply be the next M sequential addresses that would normally be produced by the video head pointer. These same addresses are coupled into an M-stage delay element 84, so that immediately after the last byte of the media error code is stored in the memory 18, the first of the M addresses is available at the output of the delay element 84.

The timing of the loading of the media error code into memory coincides with the determination of a lost packet. Loading the media error code while packet loss determination is performed places no additional timing constraints on signal flow processing. Packet error or loss detection is performed by an error detector 101 which is responsive to the CC and HD data of the current packet. The detector 101 examines the continuity count CC in the current packet to determine if it differs from the CC of the previous packet by one unit. In addition the TOGGLE bit in the current packet is examined to determine if it exhibits a different state from the TOGGLE bit of the previous packet. If either of these conditions are not satisfied, a packet error has occurred, and the media error code may be retained in memory for the current packet to reset the video decompressor. The preferred criterion for determining packet loss is for both of the above conditions not to be satisfied.

If a packet loss is detected, the video component of the current packet is stored in memory 18, starting at the next or $(M+1)^{th}$ address location. This is accomplished by conditioning the multiplexer 85 to continue to pass undelayed head pointers from the appropriate register 83. Alternatively, if a packet loss is not detected, the first M bytes of the video component in the current packet are stored in the memory locations in which the media error code was immediately previously stored. This is accomplished by the service pointer controller conditioning the multiplexer 85 to pass the delayed head pointers from the delay element 84, for M write cycles. At the end of the M write cycles the service pointer controller 93 will condition the multiplexer to again pass undelayed head pointers. When the multiplexer switches back to non delayed pointers, the next non delayed pointer will correspond to the $M+1^{th}$ address.

Depending upon the particular designs of a given receiver, it may or may not be conducive to include media error codes in different ones of the signal components when respective component transport packets are lost. In addition it may be advantageous to utilize different media error codes for different signal component formats or compression processes. Thus one or more media error code sources may be required. Regardless of the number and/or type of media error codes needed, the foregoing method of including a media error code with every packet, and then overwriting the media error code if it is not actually needed, is an extremely advantageous approach to the problem of inserting the codes.

Figure 5:
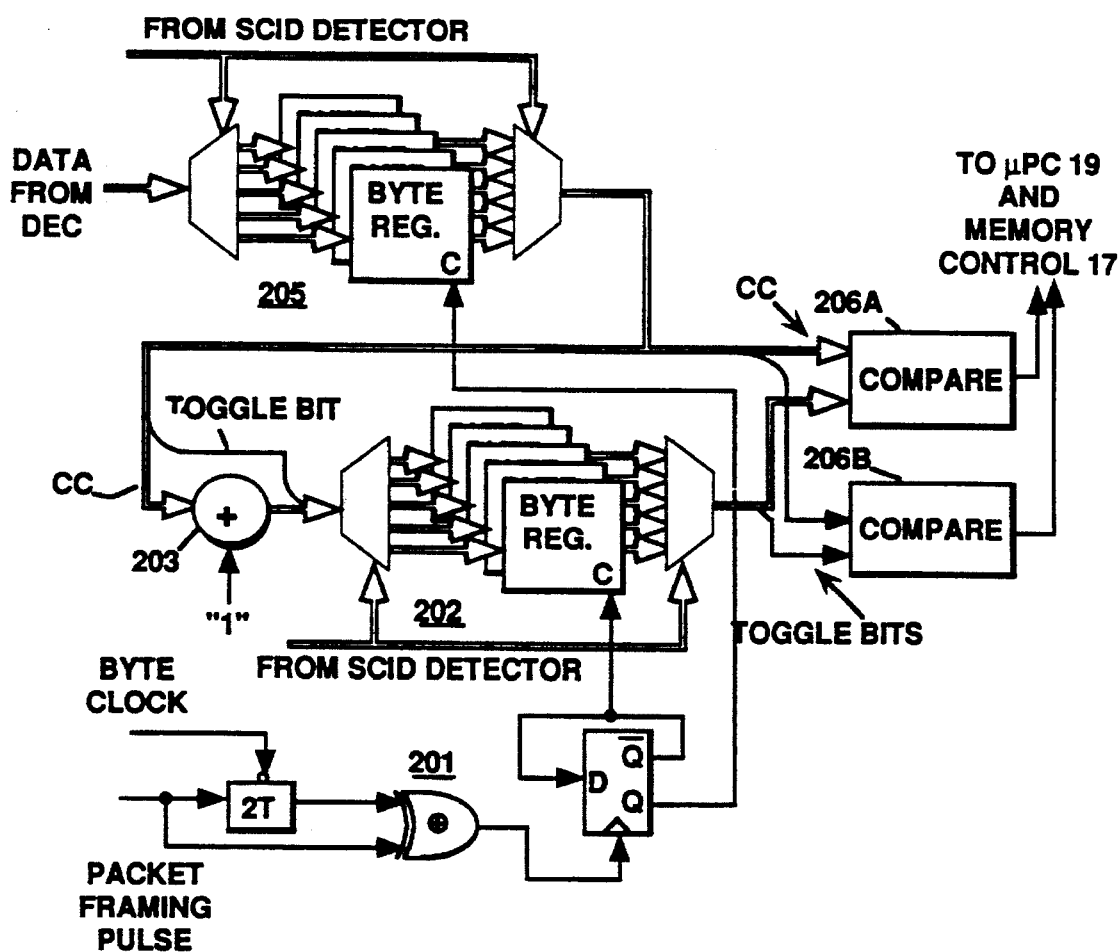
FIG. 5 is a block diagram of exemplary lost packet detection circuitry.

FIG. 5 illustrates exemplary circuitry for detecting lost packets. The hardware elements may however be realized in software within a microprocessor which may be used to control the memory management apparatus. In FIG. 5, timing circuitry 201, responsive to the packet framing pulse provided by the FEC and a byte clock, generates a positive going transition during the period the third byte of the current packet is available from the decryptor. This positive going transition loads the third data byte into the one of the byte registers 205 selected by the SCID detector control signal. The byte loaded in the register 205 includes the continuity count bits, CC, and the TOGGLE bit in the service header of the packet. The CC bits and the TOGGLE bit loaded into register 205 are respectively compared, in the comparators 206A and 206B, with similar bits in the appropriate one of the registers 202 selected by the SCID detector control signal. The output connections of the comparators 206A and 206B are coupled to the memory controller 17, which is responsive to the condition of these signals to effect certain remedial action in the event of mismatch.

The values in register 202 are generated as follows. The continuity count, CC, of successive packets of the same signal component increment by one unit for each successive packet, hence each sequential CC value is one unit greater than the prior value. The CC of the current packet is applied to the input of an adder 203 wherein it is incremented by one unit so that it equals the value of the next expected CC value for the component. The incremented value from the adder 203 is stored in the register 202, addressed according to the received SCID, for use in comparing the CC of the next payload.

The TOGGLE bit for the video component, on the other hand, is the same for all packets in a frame, and changes state in the packet containing a picture layer header. Each successive TOGGLE bit is stored unchanged in the appropriate register 202.

At the termination of the current packet, the timing circuit 201 generates a pulse which conditions the register 202 to store the incremented CC value from the current packet, and the TOGGLE bit from the current packet, in the appropriate register 202. These CC and TOGGLE bit values correspond to the CC and TOGGLE bit values expected in the next packet of the same signal component.

The memory controller monitors the output of the comparator 206A for CC mismatch detection. If a mismatch in the CC values is indicated, then the output of the comparator 206B is examined for TOGGLE mismatch. If a mismatch has occurred in both the CC and TOGGLE values, a first mode of remedial action is initiated. If a mismatch has occurred only in the CC value, a second mode of remedial action is initiated. The first mode causes the transport processor to search for the next occurring packet containing a picture layer header. This packet may be at the beginning of the next frame of data, or it may be a packet especially arranged to contain redundant picture layer header data. See for example U.S. Pat. No. 5,289,276. The processor will recommence passing video component data to the memory 18 starting with the first packet containing the picture layer header.

In the second mode, the presumption is made that a less severe data loss has occurred, and it is not necessary to reset processing on a frame boundary. Rather processing is reset to a slice boundary. For the definition of a slice the reader is referred to GENERIC CODING OF MOVING PICTURES AND ASSOCIATED AUDIO, Recommendation H.262, ISO/IEC 13818-2 Committee Draft (International Standardisation Organization). Resetting to a slice boundary is initiated by causing the system to not pass further video component data to memory 18 until occurrence of the next packet which contains an MPEG start code.

The packets containing the picture layer header or the slice staff code are detected via the programmable matched filter 09. Filter 09 is conditioned by the memory controller 17 to detect packets containing the one or the other of picture layer or slice layer start codes, responsive to one or both of the comparators 206A and 206B indicating mismatch respectively.

It should be noted that at each packet containing a picture layer header the comparator 206B will produce an erroneous mismatch because the TOGGLE bit changes in these packets. This is of no consequence. The mismatch of the TOGGLE bit only comes into play if the CC's are also mismatched, and then it only effects conditioning of the system to reset to a packet containing a picture layer header. Such action will of necessity be required if there is a CC mismatch for the packet containing the picture layer header whether or not there is an erroneous TOGGLE bit mismatch.

What is claimed is:

1. Apparatus for receiving signal occurring in packets, which packets respectively include a signal payload and further data which is indicative of the integrity of received signal, said apparatus comprising:

a source of packeted signal;

a memory;

a source of a media error code;

detection means, responsive to said packeted signal, for generating a control signal on the occurrence of errors in a packet of said packeted signal;

memory management circuitry conditioned to load in said memory immediately preceding a packet payload, a media error code from said source of a media error code, and in the absence of said control signal to overwrite the media error code with payload data of a current packet;

and utilization means coupled to said memory for using packet payloads stored in said memory.

2. The apparatus set forth in claim 1 wherein said memory is operated as a first-in-first-out memory and respective said media error codes are written to memory address locations ahead of respective payloads, and in the absence of said control signal, the media error code is overwritten by first occurring payload data.

3. The apparatus set forth in claim 1 wherein said memory management means includes;

a multiplexer having first and second input ports respectively coupled to said source of packeted signal and said source of a media error code, an output port coupled to a data input port of said memory, and a control input terminal;

address generating circuitry;

delay means coupled to said address generating circuitry for delaying address signals by a number of address periods equal to the number of addresses required to load a media error code in said memory;

a further multiplexer coupled to said delay means and arranged to pass delayed or undelayed addresses to an address input port of said memory;

control circuitry for:

a) controlling said multiplexer to couple said source of a media error code to said memory data input port prior to the occurrence of respective packet payloads, and to couple said source of packeted signal to said memory data input port on the occurrence of respective packet payloads, and b) controlling said further multiplexer to couple nondelayed addresses to said address input port of said memory prior to the occurrence of respective packet payloads to load said media error code, and to continue to couple nondelayed addresses to said address input port on the occurrence of a packet payload and a control signal associated with such packet to load a payload, and to couple nondelayed addresses to said address input port of said memory for said number of address periods prior to the occurrence of respective packet payloads to load said media error code, and on the occurrence of a respective packet and an absence of a control signal associated with said respective packet, to couple delayed addresses to said address input port for said number of address periods and then nondelayed addresses to overwrite said media error code with a payload of said respective packet.

4. The apparatus set forth in claim 3 wherein said further data which is indicative of the integrity of received signal includes packet header data including a packet continuity count CC, which is a value which is incremented by a predetermined integer for successive packets, and said detection means includes circuitry for detecting whether the continuity count CC of respective packets are in proper sequence, and if not generating said control signal.

5. The apparatus set forth in claim 4 wherein said further data which is indicative of the integrity of received signal further includes in said packet header data, a toggle bit which changes state in predetermined packets, and said detection means includes circuitry for detecting whether the continuity count CC of respective packets are in proper sequence, and whether the toggle bit of successive packets is in the correct state, and if not, generating said control signal.

6. The apparatus set forth in claim 1 wherein said further data which is indicative of the integrity of received signal includes packet header data including a packet continuity count CC, which is a value which is incremented by a predetermined integer for successive packets, and said detection means includes circuitry for detecting whether the continuity count CC of respective packets are in proper sequence, and if not generating said control signal.

7. The apparatus set forth in claim 6 wherein said further data which is indicative of the integrity of received signal further includes in said packet header data, a toggle bit which changes state in predetermined packets and said detection means includes circuitry for detecting whether the continuity count CC of respective packets are in proper sequence, and the toggle bit of successive packets is in the correct state, and if not, generating said control signal.

8. The apparatus set forth in claim 7 further including apparatus for initiating remedial action in a first mode if only the continuity count CC of a respective packet is not in proper sequence, and initiating remedial action in a second mode if both the continuity count CC of a respective packet is not in proper sequence and the toggle bit is not in the correct state.

9. In a system for receiving and decompressing packeted data including packets having signal payloads and further data useful for determining the integrity of the received packeted data, said system including memory in which respective payloads are sequentially stored, and wherein media error codes are to be inserted ahead of packet payloads when a data loss is detected, a method for inserting said media error codes comprising:

storing a media error code in said memory in a sequence of memory address locations M+1 to M+N, prior to the occurrence of a packet payload where M and N are integers, and N is the number of address locations required to store the media error code;

on the occurrence of a payload, storing said packet payload in said memory in further successive memory locations M+N+1 to M+N+K if a data loss has been detected; and if a data loss has not been detected, on the occurrence of a payload, overwriting said media error code by storing said packet payload in said memory in successive memory locations M+1 to M+K, where K is the number of memory address locations required to store a respective payload.

10. In a system for receiving and decompressing packeted video signal, including packets having compressed video signal payloads and further data useful for determining loss of packets, an inverse transport processor including a packet loss detector and a memory in which respective compressed video signal payloads are sequentially stored, and wherein media error codes are to be inserted ahead of compressed video signal payloads when a packet loss is detected, a method for inserting said media error codes comprising:

storing a media error code in said memory in a sequence of memory address locations M+1 to M+N, prior to the occurrence of a packet payload where M and N are integers, and N is the number of address locations required to store the media error code;

on the occurrence of a compressed video signal payload, storing said compressed video signal payload in said memory in further successive memory locations M+N+1 to M+N+K if a packet loss has been detected; and if a packet loss has not been detected, on the occurrence of a compressed video signal payload, overwriting said media error code by storing said compressed video signal payload in said memory in successive memory locations M+1 to M+K, where K is the number of memory address locations required to store a respective compressed video signal payload.

11. Apparatus for receiving signal occurring in packets, which packets respectively include a signal payload and further data which is indicative of the integrity of received signal, said apparatus comprising:

an input port for receiving packeted signal;

a memory;

a source of a media error code;

multiplexing means for coupling said source of media error code for storage of a media error code in said memory prior to occurrence of each packet payload, and on occurrence of respective packet payloads, coupling said input port to said memory for storage of respective packet payloads in said memory for overwriting th media error code stored in said memory when there is no loss of packet.

* * * * *